United States Patent

Takamatu et al.

[11] Patent Number: 5,988,883
[45] Date of Patent: Nov. 23, 1999

[54] ENDLESS RETAINER OF GUIDE DEVICE AND FABRICATION METHOD THEREOF

[75] Inventors: Hiroshi Takamatu; Hiroaki Mochizuki; Tomozumi Murata; Mitsuaki Honma, all of Tokyo, Japan

[73] Assignee: THK Co., Ltd., Tokyo, Japan

[21] Appl. No.: 09/117,037

[22] PCT Filed: Dec. 24, 1996

[86] PCT No.: PCT/JP96/03766

§ 371 Date: Jul. 23, 1998

§ 102(e) Date: Jul. 23, 1998

[87] PCT Pub. No.: WO98/28549

PCT Pub. Date: Jul. 2, 1998

[51] Int. Cl.$^6$ .............................. F16C 33/56; F16C 43/08
[52] U.S. Cl. .................. 384/45; 29/898.067; 384/51
[58] Field of Search ................ 384/49, 51, 523, 384/527, 572, 45; 29/898.067

[56] References Cited

U.S. PATENT DOCUMENTS

| 3,732,606 | 5/1973 | de Germond | 29/893.063 |
| 4,886,377 | 12/1989 | Adachi et al. | 384/49 |
| 5,156,462 | 10/1992 | Jacob et al. | 384/49 |

FOREIGN PATENT DOCUMENTS

| 47-5408 | 3/1972 | Japan . |
| 63-502525 | 9/1988 | Japan . |
| 5-52217 | 3/1993 | Japan . |
| 5-126149 | 5/1993 | Japan . |
| 5-196036 | 8/1993 | Japan . |
| 5-196037 | 8/1993 | Japan . |
| 5-231433 | 9/1993 | Japan . |
| 6-56181 | 7/1994 | Japan . |

OTHER PUBLICATIONS

Abstract of Japanese Patent Publication No. 5–231432; dated Sep. 7, 1993.

*Primary Examiner*—Thomas R. Hannon
*Attorney, Agent, or Firm*—Nikaido, Marmelstein, Murray & Oram LLP

[57] ABSTRACT

An endless retainer of a guide device including a number of rolling bodies arranged at predetermined intervals for rolling at an inside of an infinite track formed in the guide device, a flexible resin connector having interposing portions interposed among the respective rolling bodies and connecting portions for connecting the respective interposing portions for holding the number of rolling bodies in an aligned state and rotatably, and the resin connector is molded by an injection molding with the rolling bodies as cores by using a resin having a dimension change rate before and after an oil absorbing or a water absorbing treatment larger than a mold shrinkage rate and is provided with clearances between the resin connector and the rolling bodies formed by the oil absorbing or the water absorbing treatment whereby handling thereof is facilitated without detaching the rolling bodies, automation of integrating the endless retainer to the guide device can be carried out and extremely smooth rotatability can be provided to the rolling bodies with certainty.

12 Claims, 9 Drawing Sheets

ENDLESS RETAINER OF GUIDE DEVICE AND FABRICATION METHOD THEREOF

FIELD OF THE INVENTION

The present invention relates to an endless retainer in a guide device of, for example, a linear guide device, a curved guide device, a pivoting bearing or the like for infinite sliding, which is inserted into an infinite track thereof and which supports relative linear movement or rotational movement between a pair of bearing races forming the infinite track, and its fabrication method.

DESCRIPTION OF RELATED ART

According to various guide devices having bearings, linear movement or rotational movement between bearing races can be carried out by utilizing rolling movement of rolling bodies comprising balls or rollers sandwiched between a pair of the bearing races. It is general to integrate a number of the rolling bodies between the bearing races by holding them by a retainer or a cage made of a metal thin plate or synthetic resin with purposes of preventing detachment of the rolling bodies when the pair of bearing races are separated from each other, achieving reduction in frictional resistance by avoiding contact among the respective rolling bodies, obtaining smooth movement by aligning the respective rolling bodies at predetermined positions and so on.

However, according to a conventional guide device using a retainer, the guide device is integrated by integrating the retainer to a side of either of the bearing races, integrating the rolling bodies to a formed rolling path of the rolling bodies and successively integrating other of the bearing races. Particularly when the guide device includes an infinite track of the rolling bodies, skill is required in the operation of integrating the guide device using the retainer and its automation is difficult.

Further, according to a conventional guide device using a cage, the cage is provided with a number of pockets and the respective rolling bodies are rotatably held in the pockets and accordingly, there is provided an advantage where the operation of integrating a number of the rolling bodies to the guide device is facilitated. However, there poses other problem in which a number of the rolling bodies need to be integrated in the respective pockets of the cage and held thereby such that the rolling bodies are not detached and enormous time and labor is required in fabricating the cage per se.

Hence, in order to resolve such problems, there have been proposed a ball retainer or a ball cage in a chain-like shape which is fabricated by injection molding of resin where balls are arranged as cores at a substantially flat face in a mold and forms a predetermined shape by being folded or bent in using it (Japanese Examined Patent Publication No. JP-B-6-56181, Japanese Unexamined Patent Publication No. JP-A-5-52217, Japanese Unexamined Patent Publication No. JP-A-5-126149, Japanese Unexamined Patent Publication No. JP-A-5-196036 and Japanese Unexamined Patent Publication No. JP-A-5-196037).

However, according to the ball retainer or the ball cage in a chain-like shape, rotatability is provided to the balls which have been cast as cores in the resin by utilizing a property of the resin that it is contracted after the injection molding. Accordingly, there are cases where an extremely long period of time is required for providing the rotatability to the balls, it is difficult to provide the smooth rotatability and the rotatability cannot be provided to the balls depending on the kind of resin.

SUMMARY OF THE INVENTION

The present invention has solved difficulty in handling a conventional retainer or a cage for rolling bodies and resolved the problem of the ball cage or the ball retainer in a chain-like shape which has previously been proposed and it is an object of the present invention to provide an endless retainer not only having advantages where the retainer can be fabricated extremely easily, handling thereof is extremely facilitated without detaching rolling bodies and an automation in integrating the retainer to a guide device can be carried out, but being capable of extremely smooth rotatability to the rolling bodies with certainly, and its fabrication method.

Hence, according to an aspect of the present invention, there is provided an endless retainer of a guide device, the endless retainer comprising a number of rolling bodies arranged at predetermined intervals for rolling at an inside of an infinite track formed in the guide device, a flexible resin connector having interposing portions interposed among the respective rolling bodies and connecting portions for connecting the respective interposing portions for holding the number of rolling bodies in an aligned state and rotatably, and the resin connector is molded by an injection molding with the rolling bodies as cores by using a resin having a dimension change rate before and after an oil absorbing or a water absorbing treatment larger than a mold shrinkage rate and is provided with clearances between the resin connector and the rolling bodies formed by the oil absorbing or the water absorbing treatment.

Further, according to another aspect of the present invention, there is provided a method of fabricating an endless retainer for molding the resin connector holding the number of rolling bodies by an injection molding with the number of rolling bodies as cores by using a resin having a dimension change rate before and after an oil absorbing or a water absorbing treatment larger than a mold shrinkage rate, and forming clearances between the resin connector and the respective rolling bodies for rotating the rolling bodies by subjecting the resin connector to the oil absorbing or the water absorbing treatment after having been removed from a mold.

According to the present invention, resin used for molding the resin connector must be a resin having the dimension change rate before and after the oil absorbing or the water absorbing treatment larger than the mold shrinkage rate and a difference between the dimension change rate before and after the oil absorbing or the water absorbing treatment and the mold shrinkage rate preferably falls in a range of 0.1 through 2.0%, more preferably, 0.5 through 1.5%. When the difference between the dimension change rate before and after the oil absorbing or the water absorbing treatment and the mold shrinkage rate falls in a range of 0.1 through 2.0%, excellent rotatability of the rolling bodies can be provided by forming the clearances between the resin connector and the rolling bodies with certainty by the oil absorbing or the water absorbing treatment. Further, when the dimension change rate before and after the oil absorbing or the water absorbing treatment becomes excessively large by exceeding the magnitude of the mold shrinkage rate, there is a concern where the rolling bodies are detached from the resin connector after the oil absorbing or the water absorbing treatment, however, according to experiments by the inventors, the difference is the utmost of about 2 through 3% and there is no concern of detaching the rolling bodies from the resin connector with such a degree of the magnitude.

Here, the dimension change rate before and after the oil absorbing or the water absorbing treatment is a percentage of a value (elongation amount) of a length (length after treatment) of the resin connector (endless retainer) after the oil absorbing or the water absorbing treatment subtracted by a length (length before treatment) of the resin connector (endless retainer) before the oil absorbing or the water absorbing treatment as compared with the length (length before treatment) of the resin connector (endless retainer) before the oil absorbing or the water absorbing treatment and the mold shrinkage rate is a value calculated by the following equation in accordance with JIS K6911,5.7.

Mold shrinkage rate={(mold dimension−molded product dimension)÷mold dimension}×100

Further, in respect of the resin used for molding the resin connector according to the present invention, it is necessary that the molded resin connector can smoothly be moved along with the rolling bodies in an infinite track of the rolling bodies formed by bearing races of the guide device and for that purpose, the resin of the resin connector needs to have flexibility and Shore hardness of the resin preferably falls in a range of 35 through 75, more preferably, 40 through 60.

As the resin preferable in fabricating the resin connector having such a flexibility, for example, there are polyamide-base elastomer such as Pebax (commercial name made by Toray Corporation) or the like, polyester-base elastomer such as Hytrel (commercial name made by Toray and DuPont Corporations) or the like, elastomers of polyurethane-base elastomer, styrene-base elastomer, olefin-base elastomer and the like, soft polyvinyl chloride and so on and elastomers are preferable. Further, among the elastomers, in consideration of properties required for the resin connector, particularly, softness or flexibility, the dimension change rate in absorbing oil or absorbing water, chemical proof, elongation and the like, polyamide-base or polyester-base elastomer is more preferable and further, in consideration of a time period whereby the elongation amount reaches a saturated state in the oil absorbing or the water absorbing treatment, in other words, a time period until a change in dimension is stabilized (dimension stabilizing time), polyester-base elastomer is preferable.

Further, according to the present invention, a ball or a roller is pointed out as the rolling body used in the guide device and the ball is preferable in an endless retainer used in a guide device necessitating smooth slidability and the roller is preferable for an endless retainer used in a guide device necessitating to apply comparatively heavy load.

In fabricating an endless retainer according to the present invention, resin having the dimension change rate before and after the oil absorbing or the water absorbing treatment larger than the mold shrinkage rate is used, the resin connector holding the number of rolling bodies is molded by injection molding with the number of rolling bodies as cores and after removing the resin connector from a mold, clearances for rotating the rolling bodies are formed between the resin connector and the respective rolling bodies by subjecting the resin connector to the oil absorbing or the water absorbing treatment.

Here, in respect of injection molding with a number of rolling bodies as cores, so-called insert molding processes such as methods described in Japanese Examined Patent Publication No. JP-B-6-56181, Japanese Unexamined Patent Publication No. JP-A-5-52217, Japanese Unexamined Patent Publication No. JP-A-5-126149, Japanese Unexamined Patent Publication No. JP-A-5-196036 and Japanese Unexamined Patent Publication No. JP-A-5-196037 mentioned above are applicable.

Further, in respect of the oil absorbing or the water absorbing treatment for providing rotatability to the respective rolling bodies in the molded endless retainer, although arbitrary methods of a method of dipping an endless retainer which has been removed from a mold into oil or water, a method of spraying misty oil or water to an endless retainer which has been removed from a mold, a method of making an endless retainer which has been removed from a mold absorb oil or water under predetermined heating and pressing by using an autoclave or the like, a method of leaving an endless retainer which has been removed from a mold under high humidity, a method of leaving an endless retainer which has been removed from a mold in the atmosphere for a predetermined time period, and the like can be adopted, the preferable method is the method of dipping an endless retainer which has been removed from a mold into oil or into water and the more preferable method is the method for dipping the endless retainer into oil.

Further, also in respect of treatment conditions of the oil absorbing or the water absorbing treatment in this case, pertinent conditions can be selected and adopted depending on the method of treatment, the kind of resin used and the like, for example, according to the method of dipping an endless retainer which has been removed from a mold into oil or into water, normally, the endless retainer is normally dipped at temperature of normal temperature through 50° C. for several minutes through several hours, although the conditions differ also depending on the kind of resin.

The oil absorbing or the water absorbing treatment is for providing rotatability to a rolling body of a molded endless retainer and although when the rotatability is provided to the rolling body by the oil absorbing treatment, the rolling body can be integrated to a guide as it is, when, for example, moisture is adhered to the surface of the endless retainer after the treatment as in the case where the water absorbing treatment is carried out by dipping the endless retainer into water, the endless retainer is integrated to the guide device preferably after removing the moisture adhered to the surface.

As oil used in the oil absorbing treatment, although liquid lubricant, grease or petrolatum of semi-solid lubricant or the like having lubricating performance may be used, the oil is preferably liquid lubricant having lubricating performance, for example, lubricant of mineral oil-base or synthetic oil-base, lubricant of emulsion-base, liquid metal-base, water-base or the like can be pointed out.

Although in the oil absorbing or the water absorbing treatment, an elongation amount of an endless retainer after the treatment as compared with that before the treatment, that is, the elongation amount of the resin connector reaches to a saturated state after a constant period of time, the oil absorbing or the water absorbing treatment is not always necessary to carry out until the elongation amount reaches the saturated state, it is sufficient that the elongation amount of at least 0.1% or more, preferably, 0.3% or more in respect of the length before the treatment is shown and free rotatability of respective rolling bodies is provided to the resin connector.

However, when an endless retainer provided by finishing the oil absorbing or the water absorbing treatment is used by integrating it to a guide device before reaching the saturated state, the resin connector of the endless retainer absorbs lubricant used in the guide device and is elongated until it reaches the saturated state and there is a concern of effecting a hazard in the smooth sliding movement of the endless retainer in the guide device and accordingly, the oil absorbing or the water absorbing treatment is preferably carried out until the elongation amount of the endless retainer reaches a state near to the saturated state before being integrated to the guide device. Accordingly, in such a point of view, with respect to resin used as the resin connector, in consideration of the productivity, polyester-base elastomer having a comparatively short time period whereby elongation amount reaches the saturated state in the oil absorbing treatment (dimension stabilizing time) is preferable.

Further, according to the endless retainer of the present invention, chamfered guide portions are preferably formed at both distal ends of the resin connector by which in moving an infinite track formed by bearing races of the guide device, particularly when the front end portion of the endless retainer moves into a direction change path of the infinite track or when it moves out from the direction change path, the endless retainer can be moved by guiding the front end portion by the chamfered guide portion.

The chamfered guide portions formed at the both distal ends of the resin connector, are designed by considering a radius of curvature of the direction change path of the infinite track formed by the bearing races of the guide device and determining the size of the radius of curvature, the shape and so on. By forming the chamfered guide portions at the both distal ends of the resin connector, in the reciprocating movement of the guide device, the endless retainer can smoothly be guided in either of direction of progressing and regressing.

Further, although the length of the molded endless retainer is determined by considering the length of the infinite track of the guide device where it is used, when the guide device is large-sized and the length of the infinite track is large, the endless retainer may be molded by dividing it in a plural number of 2, 3 or the like by which the size of a mold for molding the endless retainer can be reduced. Further, in that case, it is preferable to form the chamfered guide portions respectively at both distal ends of the resin connector of each of the endless retainers divided in the plural number.

According to the present invention, in molding the resin connector by injection molding with the rolling bodies as cores, the resin connector holding the rolling bodies after having been removed from a mold, is shrunk in accordance with the magnitude of the mold shrinkage rate, by subjecting the resin connector to the oil absorbing or the water absorbing treatment, the resin connector is expanded in accordance with the magnitude of the dimension change rate before and after the oil absorbing or the water absorbing treatment and further, the dimension change rate before and after the oil absorbing or the water absorbing treatment is larger than the mold shrinkage rate and accordingly, portions surrounding the rolling bodies expand to exceed lengths at surroundings of the rolling bodies and as a result, clearances are formed between the rolling bodies and the resin connector with certainty by which excellent rotatability seems to be provided to the rolling bodies.

Figure 1:
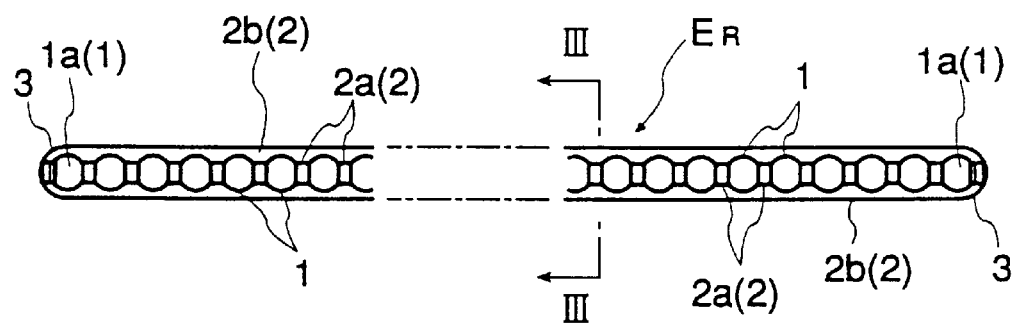
FIG. 1 is a plane view showing an endless retainer in a chain-like shape according to an embodiment of the present invention.
Figure 2:
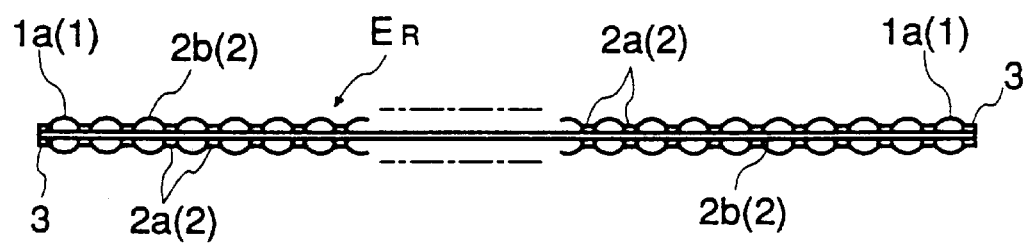
FIG. 2 is a front view of FIG. 1.
Figure 3:
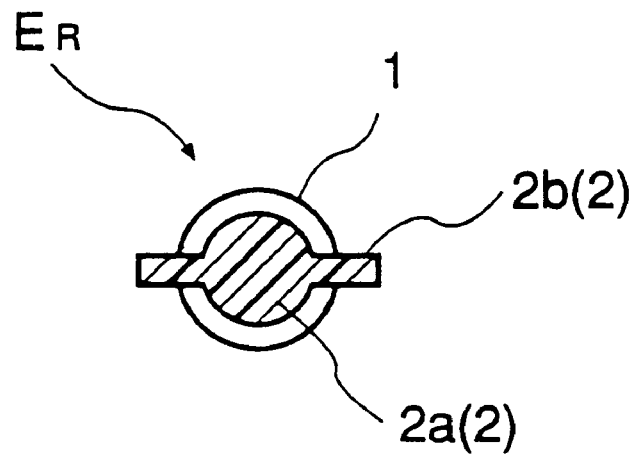
FIG. 3 is a sectional view taken along a line III—III of FIG. 1.

DESCRIPTION OF REFERENCE NUMERAL $E_R$: endless retainer, 1 or 1a: ball, 2: resin connector, 2a: interposing portion, 2b: connecting portion, 3: chamfered guide portion, 4: track rail (one bearing race), 5: sliding base (other bearing race), 5a: loaded ball rolling face, 5b: through hole, 6: ball guide member, 6a: unloaded ball guide hole, 6b: loaded ball guide groove, 6c: direction change guiding unit, 7: lid, 8: direction change path.

DETAILED DESCRIPTION OF THE PREFERRED EMBODIMENTS

A specific explanation will be given of an endless retainer according to the present invention and its fabrication method based on embodiments, test examples and application examples shown by attached drawings as follows.

Embodiment 1

FIG. 1 through FIG. 4 show an endless retainer $E_R$ in a chain-like shape according to the embodiment of the present invention. The endless retainer $E_R$ is constituted by a number of balls 1 made of bearing steel (SUJ 2) arranged at predetermined intervals and a flexible resin connector 2 having interposing portions 2a interposed among the respective balls 1 and connecting portions 2b for connecting the respective interposing portions 2a for holding a number of balls 1 linearly and rollably.

Figure 4:
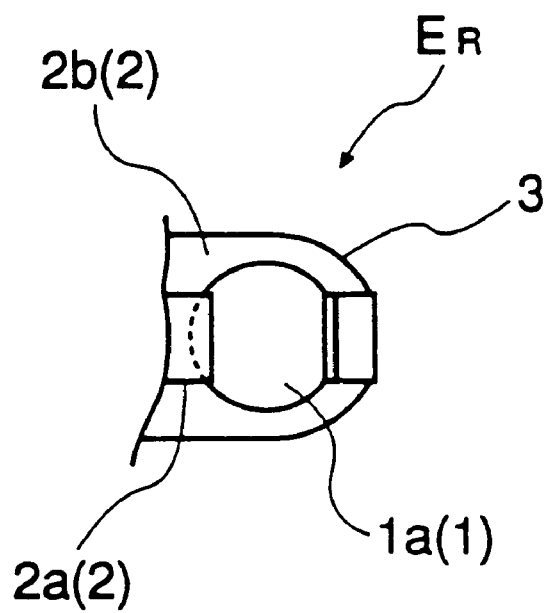
FIG. 4 is a partially enlarged plane view showing an end portion of the endless retainer of FIG. 1 by enlargement.

Further, according to the embodiment, as shown by FIG. 4, at both distal ends of the resin connector 2, chamfered guide portions 3 each having a section substantially in a circle concentric to the balls 1a, are formed at distal end portions surrounding the balls 1a disposed at the distal ends.

The endless retainer $E_R$ is fabricated by the following procedure.

First, a mold with a number of the balls 1 as cores is used and the resin connector 2 is molded by injection molding of 6•6 nylon-polyamide-base elastomer (made by Toray Corporation, commercial name: Pebax® 5533SA, mold shrinkage rate: 0.43% in flow direction and 0.74% in direction orthogonal to flow, Shore hardness: 55) and fabricated by removing it from the mold along with the number of balls 1.

Next, the endless retainer $E_R$ fabricated in this way is subjected to an oil absorbing treatment or a water absorbing treatment by the following methods, length dimensions before and after the treatment are measured and dimension change rates before and after the oil absorbing or the water absorbing treatment are calculated.

Further, in calculating the dimension change rates before and after the oil absorbing or the water absorbing treatment, the dimension change rates are measured by preparing 5 pieces of samples of the endless retainer $E_R$ and in respect of each of the samples.

[Method A]

The molded endless retainer $E_R$ is immediately dipped into a mineral-base lubricant at normal temperature and left in the lubricant as it is and the dimension change rates (elongation rates) are calculated by measuring the lengths of the samples of the endless retainer $E_R$ after 1 hour, after 6 hours, after 50 hours, after 80 hours and after 124 hours since the dipping operation has been started.

Figure 5:
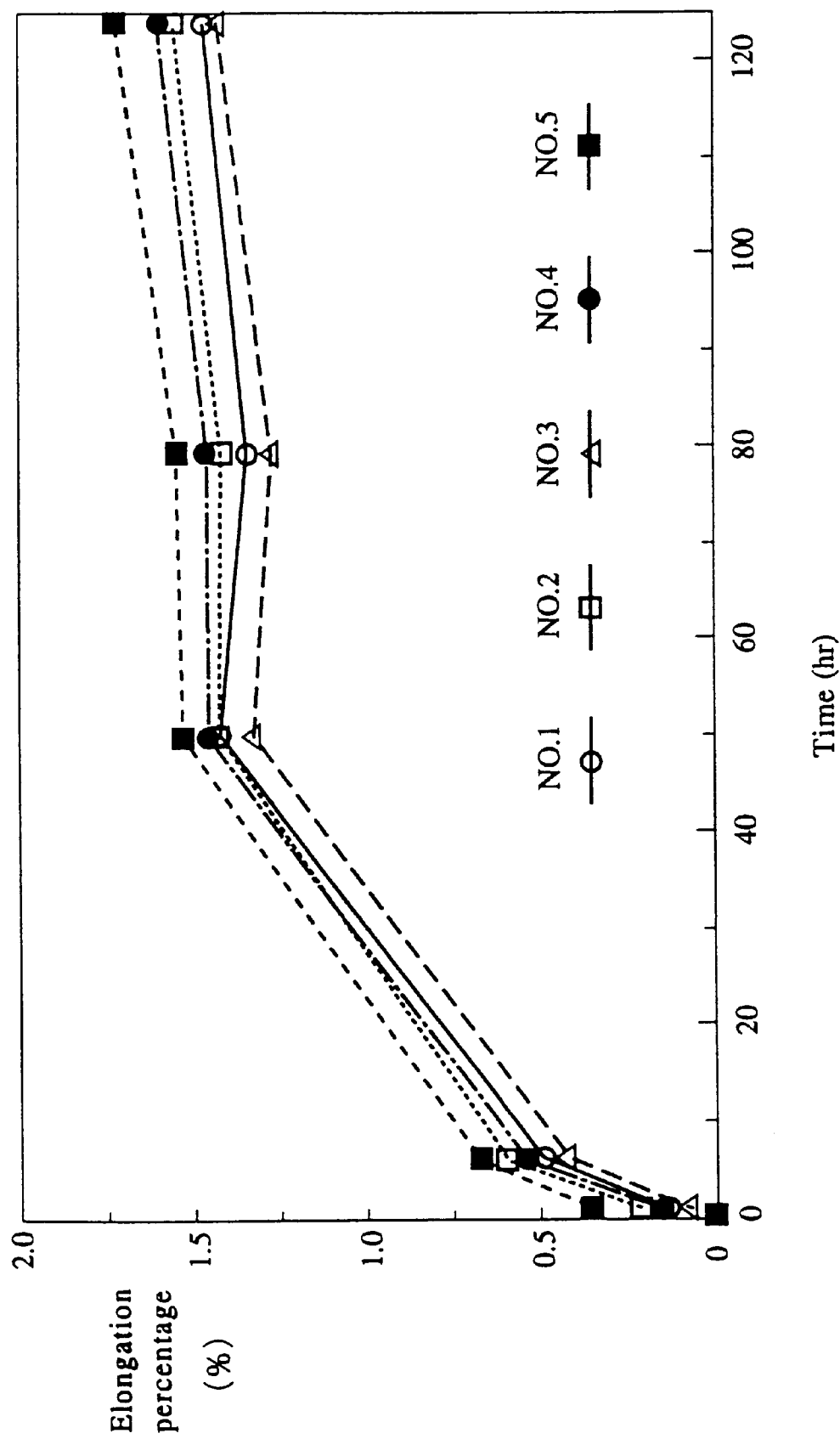
FIG. 5 is a graph diagram showing a time-sequential change in an elongation rate when an oil absorbing treatment is carried out in accordance with Method A.

Table 1 shows the lengths of the samples of the endless retainer $E_R$ in starting dipping operation, 1 hour after start of dipping and 6 hours after start of dipping and the elongation rates at the respective measurements are shown by FIG. 5.

TABLE 1

| Sample No. | Length (mm, upper column) and Elongation rate (%, lower column) | | |
|---|---|---|---|
| | Start of dipping | 1 hour after start of dipping | 6 hours after start of dipping |
| No. 1 | 115.988 | 116.144 | 116.552 |
| | (0.00) | (0.13) | (0.49) |
| No. 2 | 115.973 | 116.207 | 116.656 |
| | (0.00) | (0.20) | (0.59) |
| No. 3 | 116.058 | 116.155 | 116.548 |
| | (0.00) | (0.08) | (0.42) |
| No. 4 | 116.017 | 116.220 | 116.636 |
| | (0.00) | (0.17) | (0.53) |
| No. 5 | 115.883 | 116.292 | 116.655 |
| | (0.00) | (0.35) | (0.67) |

The rotatability of ball is investigated as follows in respect of the samples of the endless retainer $E_R$. That is, the sample of the endless retainer $E_R$ is sandwiched between two sheets of plates, one of the plates is fixed while the other thereof is moved and whether the sample of the endless retainer $E_R$ is moved at the occasion and smoothness of movement when the sample is moved are qualitatively investigated.

As a result, in respect of the samples of 1 hour after start of dipping, the rotatability of ball is confirmed except the sample of No. 3, the comparatively smooth rotatability of ball is confirmed in respect of the samples of 6 hours after start of dipping and the extremely excellent rotatability of ball is confirmed in respect of samples of 50 hours after start of dipping.

[Method B]

The molded samples of the endless retainer $E_R$ are immediately dipped into a mineral-base lubricant at normal temperature for 5 minutes, thereafter taken out from the lubricant and left in a room, and the dimension change rates (elongation rates) are calculated by measuring lengths of the samples of the endless retainer $E_R$ at immediately after taking them out from the lubricant (0 hour), 24 hours thereafter, 45 hours thereafter, 69 hours thereafter, 118 hours thereafter and 190 hours thereafter, respectively.

Figure 6:
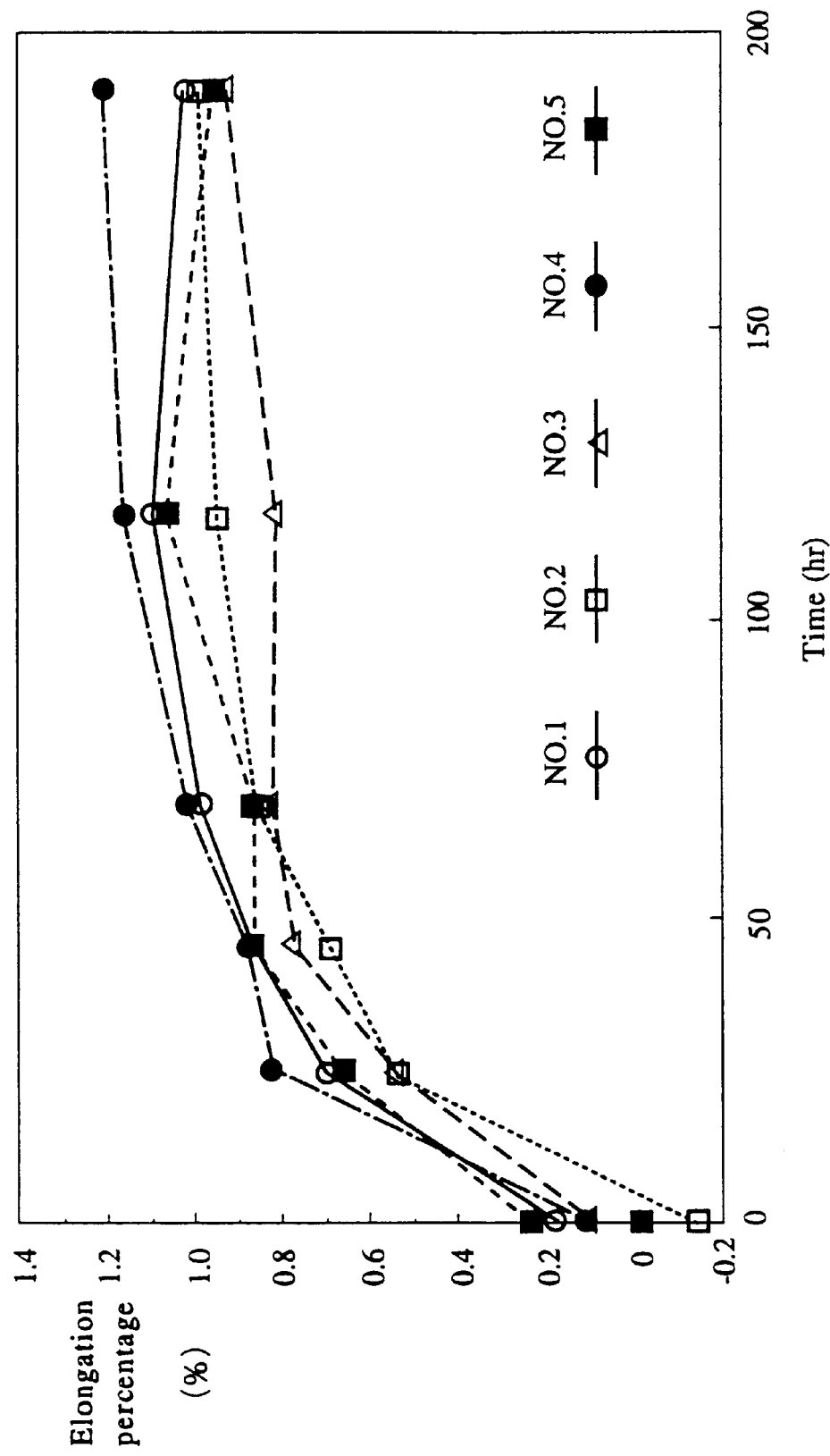
FIG. 6 is a graph diagram showing a time-sequential change in an elongation rate when an oil absorbing treatment is carried out in accordance with Method B.

The result is shown by FIG. 6. Further, as a result of investigating the rotatability of ball similar to the case of Method A mentioned above, the rotatability of ball is recognized in respect of the samples of the endless retainer $E_R$ immediately after having been taken out from the lubricant except the sample of No. 2 and the comparatively excellent rotatability of ball is recognized in respect of the samples of 24 hours or longer after starting to leave them in the room.

[Method C]

Figure 7:
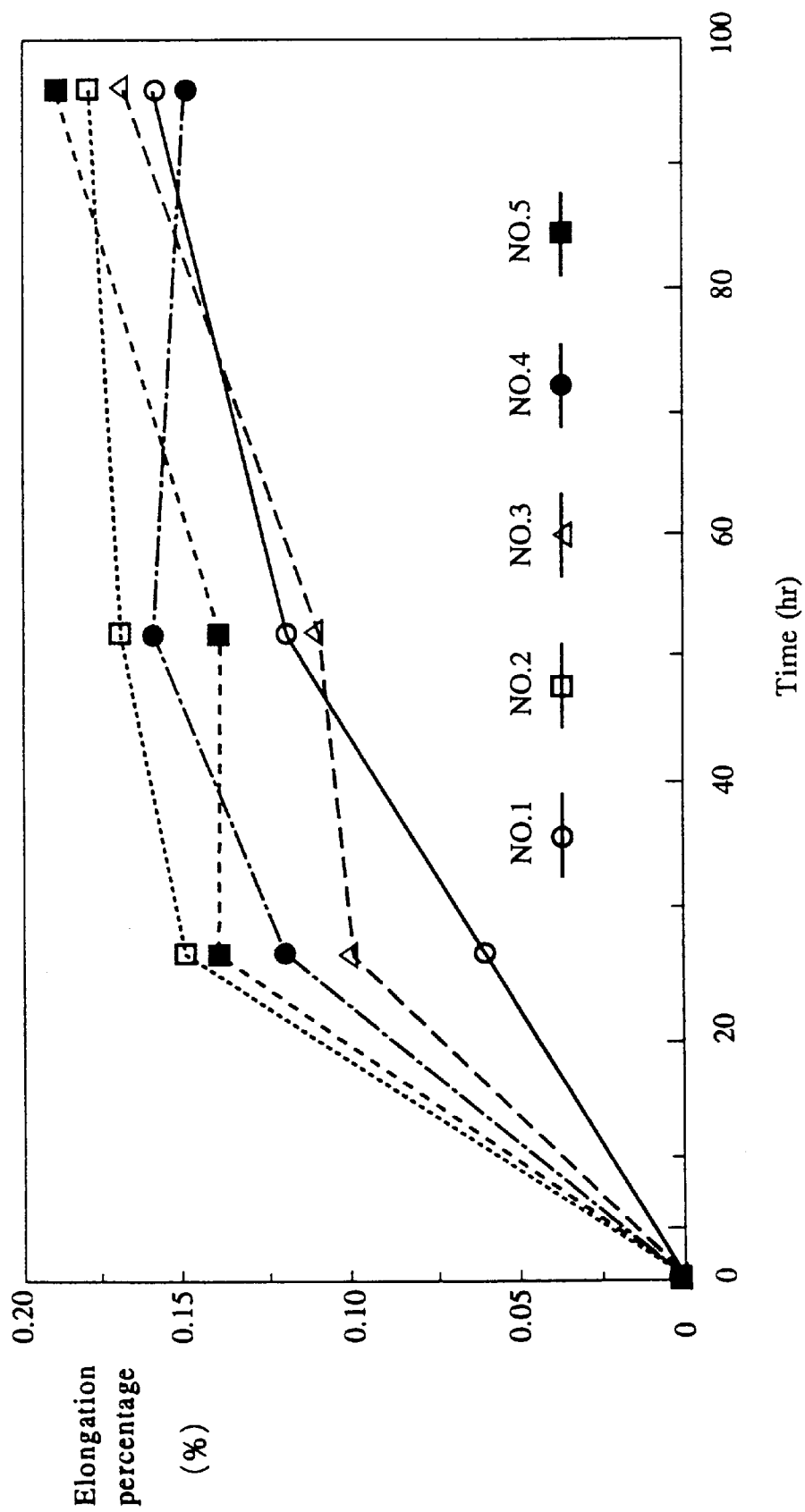
FIG. 7 is a graph diagram showing a time-sequential change of an elongation rate when a water absorbing treatment is carried out in accordance with Method C.

The molded samples of the endless retainer $E_R$ are left in the atmosphere as they are (temperature 23° C., humidity 50 through 60%) and the dimension change rates (elongation rates) are calculated by measuring lengths of the samples of the endless retainer $E_R$ of 24 hours after starting to leave them, 40 hours thereafter and 96 hours thereafter, respectively. The result is shown in FIG. 7.

Further, as a result of investigating the rotatability of ball similar to the case of Method A mentioned above, the rotatability of ball is recognized in respect of the samples of the endless retainer $E_R$ of 24 hours after starting to leave them in the atmosphere except the sample of No. 1 and the rotatability of ball is recognized in respect of all the samples of the endless retainer $E_R$ of 48 hours after starting to leave them.

Embodiment 2

6•6 nylon-polyamide-base elastomer (made by Toray Corporation, commercial name: Pebax 5533SA) the same as that used in Embodiment 1 mentioned above and polyester-base elastomer (made by Toray Corporation and DuPont Corporation, commercial name: Hytrel® 4767, mold shrinkage rate: 1.2 through 1.5%, hardness under JIS K7215: 47) are used, the resin connectors 2 are molded similar to Embodiment 1 mentioned above, a oil absorbing treatment is successively carried out in accordance with the dipping method of Method A, the dimension change rate (elongation rate) in this occasion is time-sequentially investigated and a time period (dimension stabilizing time) until the change in dimensions is stabilized within a range of the elongation rate of 0.5 through 1.5% in carrying out the oil absorbing treatment, is investigated. The result is shown by FIG. 8.

Figure 8:
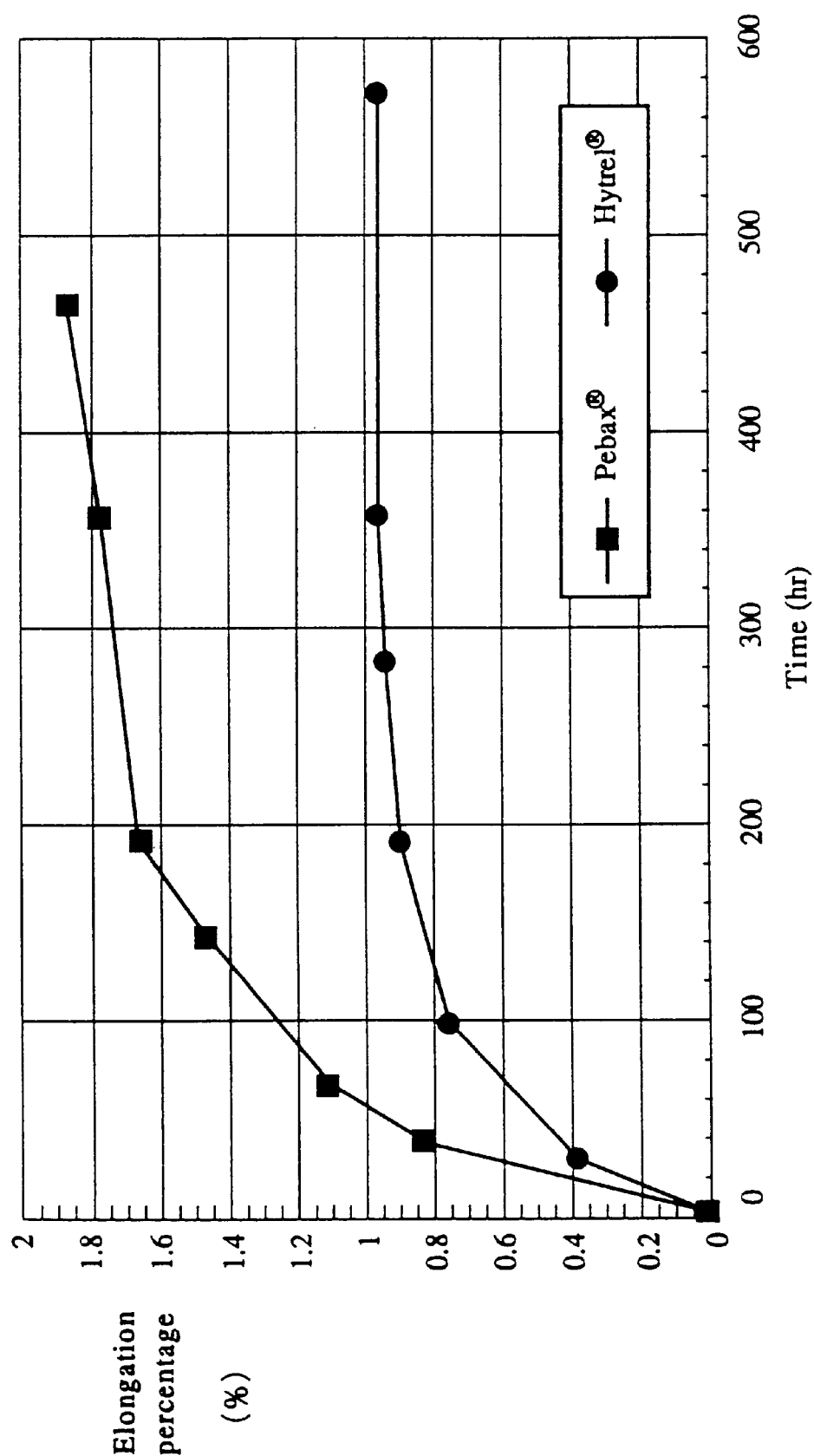
FIG. 8 is a graph diagram showing a relationship between an elapse time and the elongation rate after dipping endless retainers in respect of two kinds of endless retainers provided in Embodiment 2.

As is apparent from the result of FIG. 8, in the case of 6•6 nylon-polyamide-base elastomer, the elongation rate exceeds about 0.8% at 100 minutes after starting to dip the sample in the oil absorbing treatment, successively, rapid change in dimension is observed up to about 200 hours and little by little change in dimension is caused thereafter even after 460 hours has elapsed. By contrast, in the case of polyester-base elastomer, the elongation rate exceeds 0.5% at about 50 hours after staring to dip the sample in the oil absorbing treatment and reaches about 0.8% for 100 hours, a gradual change in dimension is successively observed up to about 200 hours, however, almost no change in dimension is observed thereafter even exceeding 500 hours.

As a result, it is known that by using polyester-base elastomer, a time period for reaching a range of the preferable elongation rate of 0.5 through 1.5% is prolonged compared with the case of 6•6 nylon-polyamide-base elastomer, however, the dimension stabilizing time period for stabilizing the change in dimension is significantly shortened, which is advantageous in fabricating the endless retainer $E_R$.

Application Example 1

Figure 9:
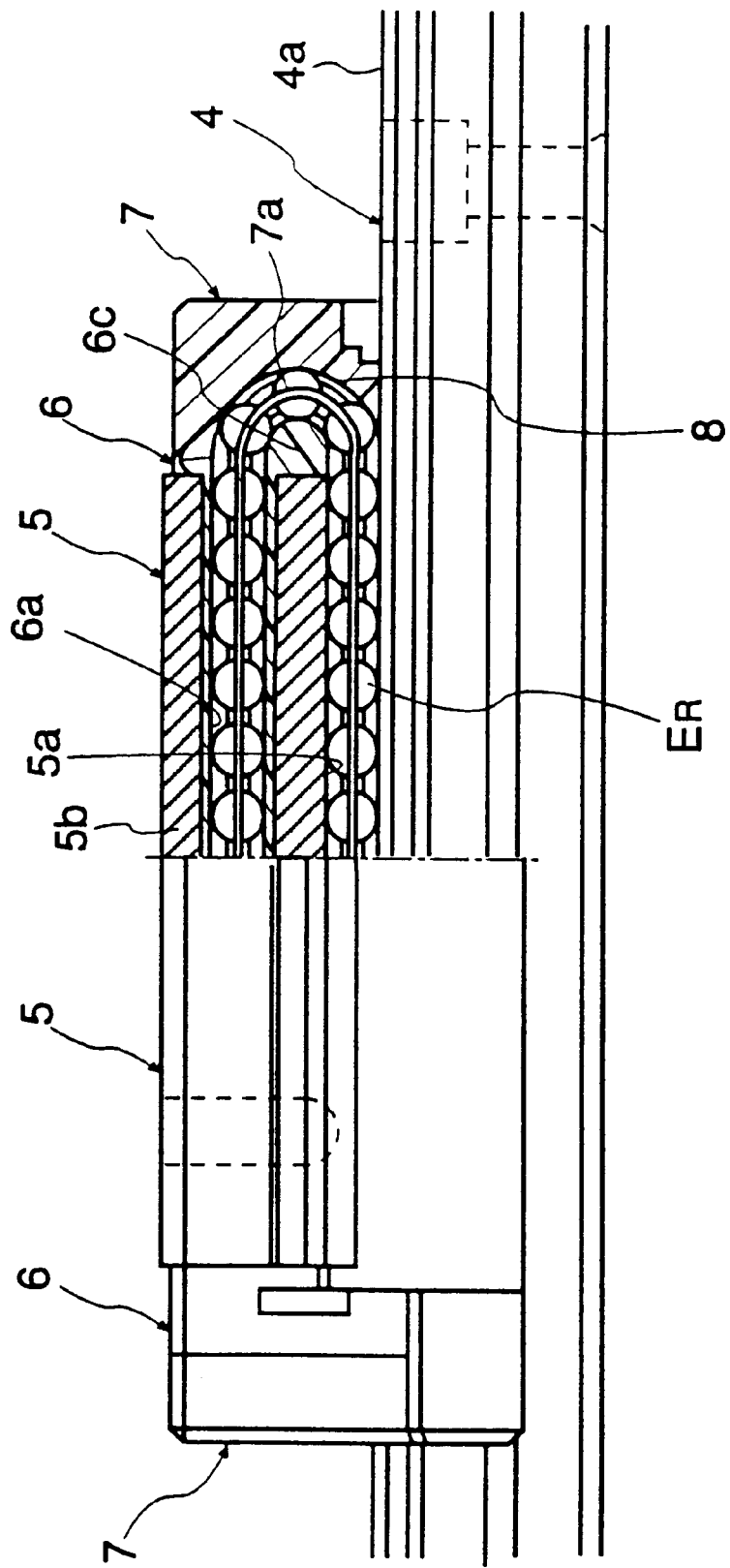
FIG. 9 is a partially sectional side view showing a linear guide device for infinite sliding integrated with an endless retainer fabricated by the invented method (Method B)
Figure 10:
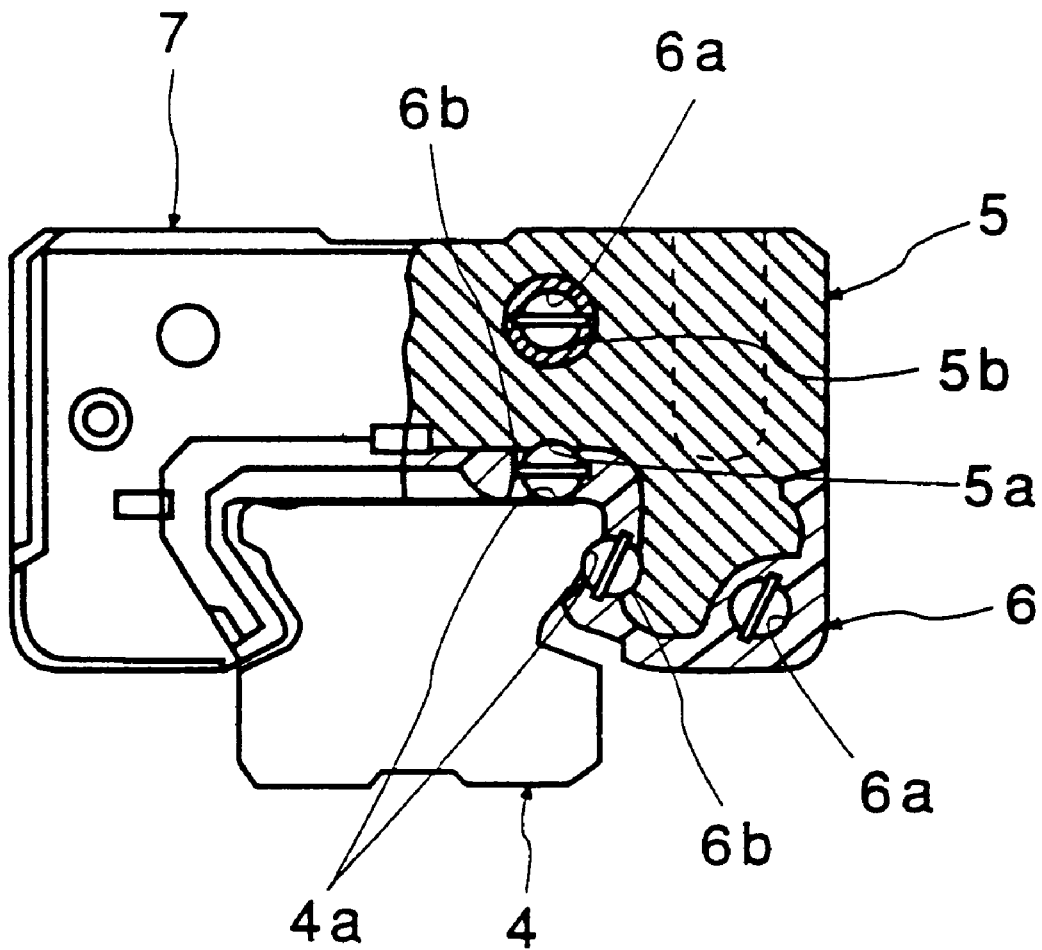
FIG. 10 is a partially sectional front view of FIG. 9.

A linear guide device for infinite sliding shown by FIG. 9 and FIG. 10 is constituted by using the endless retainer $E_R$ which has been subjected to the oil absorbing or the water absorbing treatment in accordance with Method B in Embodiment 1.

The linear guide device for infinite sliding is basically constituted by a rigid track rail (one bearing race) 4 made of metal, a rigid sliding base (other bearing race) 5 made of metal, a ball guide member 6 made of synthetic resin and attached to the sliding base 5 by insert molding and lids 7 made of synthetic resin and attached to the sliding base 5 along with the ball guide member 6.

Further, the track rail 4 is formed with rolling faces 4a of balls 1 at both shoulder portions thereof and the sliding base 5 is formed with loaded ball rolling faces 5a of the balls 1 on which load is applied and through holes 5b through which the balls 1 in an unloaded state pass. Further, the ball guide member 6 is formed with unloaded ball guide holes 6a for guiding rolling of the balls 1 under the unloaded state, loaded ball guide grooves 6b for guiding rolling of the balls 1 under a loaded state and direction change guiding units 6c for guiding to change the direction of the balls 1 by communicating and connecting the unloaded ball holes 6a with the loaded ball guide grooves 6b by a predetermined radius of curvature. Further, the lid 7 is formed with direction change guide grooves 7a for constituting direction change paths 8 of the balls 1 along with the direction change guide portions 6c of the ball guide members 6 mentioned above.

According to the embodiment, an infinite track of the ball 1 is constituted by the loaded ball rolling face 5a of the sliding base 5 as well as the loaded ball guide groove 6b of the ball guide member 6 opposed thereto, the unloaded ball guide hole 6a of the ball guide member 6, the direction change guide portions 6c of the ball guide members 6 and the direction change guide grooves 7a of the lids 7 opposed thereto.

In respect of the linear guide device fabricated in this way, rolling resistance of the sliding base 5 with respect to the track rail 4 is measured by fixing the track rail 4 and pushing the sliding base 5 by a load cell at a sampling frequency of 500 Hz of the load cell.

Figure 11:
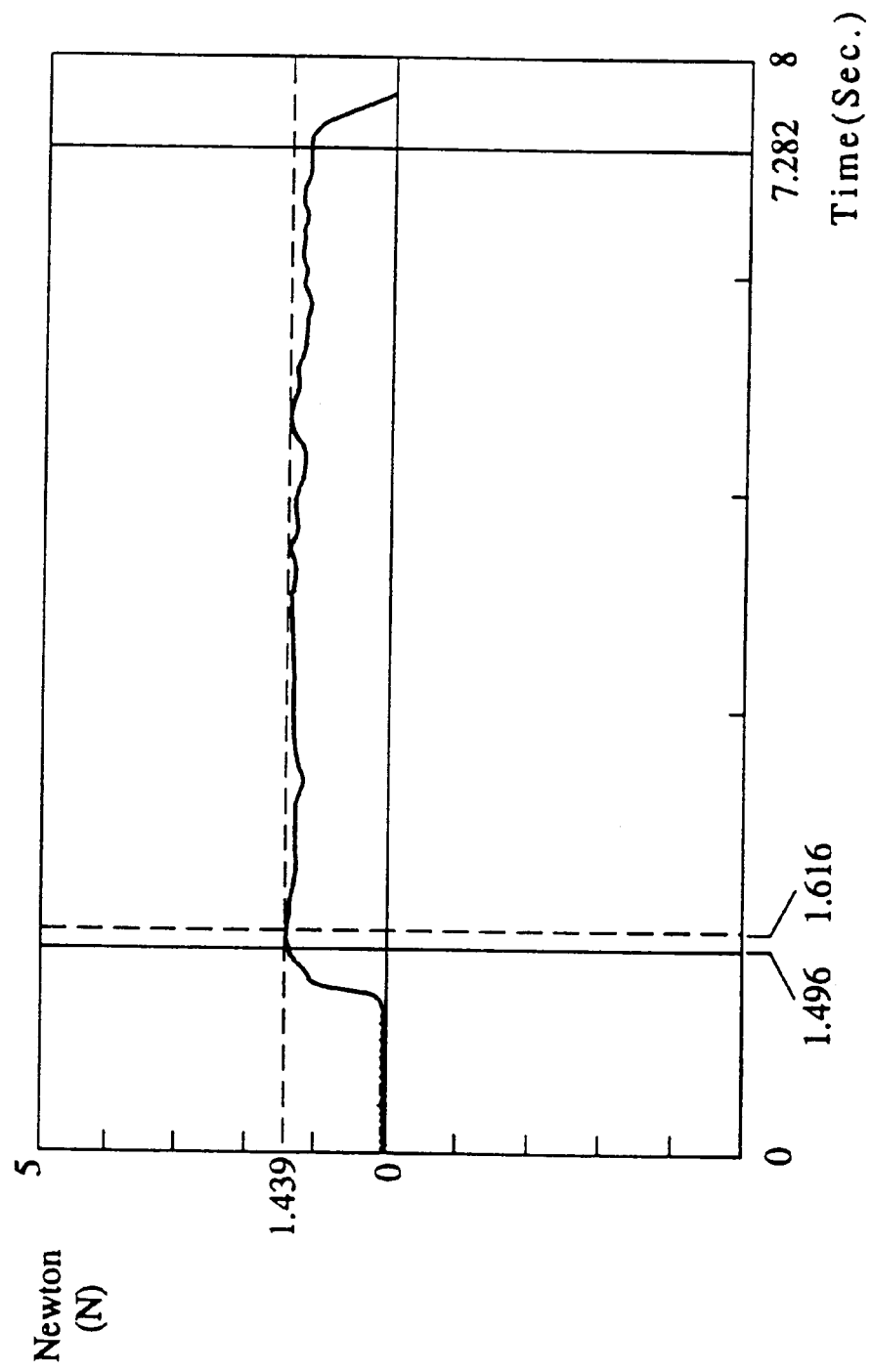
FIG. 11 is a graph diagram of measuring rolling resistance by using a load cell which has been measured in respect of the linear guide device of FIG. 9.

The result is as shown by FIG. 11 in which values of the rolling resistance in a moving region partitioned by bold lines are 1.389 Newton (N) in starting, 1.439 N as maximum rolling resistance, 1.179 N as minimum rolling resistance and 1.302 N as average rolling resistance which is found to be extremely smooth.

Industrial Applicability

An endless retainer according to the present invention is not only provided with advantages where fabrication thereof is extremely facilitated, handling thereof is extremely easy without detachment of rolling bodies and automation in integrating the retainer to a guide device can be carried out but is capable of providing extremely smooth rotatability to the rolling bodies with certainty.

Accordingly, the endless retainer of the present invention is extremely useful for use of, for example, a linear guide device or a curved guide device for infinite sliding and a guide device of pivoting bearing or the like.

What is claimed is:

1. An endless retainer of a guide device, said endless retainer comprising:
    a number of rolling bodies arranged at predetermined intervals for rolling at an inside of an infinite track formed in the guide device;
    a flexible resin connector having interposing portions interposed among the respective rolling bodies and connecting portions for connecting the respective interposing portions for holding the number of rolling bodies in an aligned state and rotatably; and
    wherein the resin connector is molded by an injection molding with the rolling bodies as cores by using a resin having a dimension change rate before and after an oil absorbing or a water absorbing treatment larger than a mold shrinkage rate and is provided with clearances between the resin connector and the rolling bodies formed by the oil absorbing or the water absorbing treatment.

2. The endless retainer of a guide device according to claim 1:
    wherein a difference between the dimension change rate before and after the oil absorbing or the water absorbing treatment of the resin forming the resin connector falls in a range of 0.1 through 2.0%.

3. The endless retainer of a guide device according to claim 1 or 2:
    wherein an oil used in the oil absorbing treatment is a mineral oil-base or a synthetic oil-base lubricant.

4. The endless retainer of a guide device according to any one of claim 1 or 2:
    wherein chamfered guide portions for guiding a front end portion of the resin connector are installed at both distal ends of the resin connector.

5. The endless retainer of a guide device according to any one of claim 1 or 2:
    wherein Shore hardness of the resin forming the resin connector falls in a range of 35 through 75.

6. The endless retainer of a guide device according to any one of claim 1 or 2:
    wherein the resin forming the resin connector is any of polyamide-base elastomer, polyester-base elastomer, polyurethane-base elastomer, styrene-base elastomer and olefin-base elastomer.

7. The endless retainer of a guide device according to any one of claim 1 or 2:
    wherein the rolling body is a ball.

8. A method of fabricating an endless retainer of a guide device, said endless retainer comprising:
    a number of rolling bodies arranged at predetermined intervals for rolling at an inside of an infinite track formed in the guide device;
    a flexible resin connector having interposing portions interposed among the respective rolling bodies and connecting portions for connecting the respective interposing portions for holding the number of rolling bodies in an aligned state and rotatably, said method of fabricating the endless retainer comprising the steps of:
    molding the resin connector holding the number of rolling bodies by an injection molding with the number of rolling bodies as cores by using a resin having a dimension change rate before and after an oil absorbing or a water absorbing treatment larger than a mold shrinkage rate; and
    forming clearances between the resin connector and the respective rolling bodies for rotating the rolling bodies by subjecting the resin connector to the oil absorbing or the water absorbing treatment after having been removed from a mold.

9. The method of fabricating an endless retainer according to claim 8:
    wherein the oil absorbing or the water absorbing treatment is carried out by dipping the resin connector holding the rolling bodies into an oil or water.

10. The method of fabricating an endless retainer according to claim 8 or 9:
    wherein the oil used in the oil absorbing treatment is a mineral oil-base or a synthetic oil-base lubricant.

11. The method of fabricating an endless retainer according to claim 8:
    wherein the resin forming the resin connector is any of polyamide-base elastomer, polyester-base elastomer, polyurethane-base elastomer, styrene-base elastomer and olefin-base elastomer.

12. A guide device comprising:

a pair of bearing races;

a number of rolling bodies rolling at an inside of an infinite track formed between the pair of bearing races;

wherein the number of rolling bodies are formed in an endless retainer in a chain-like shape by being held in an aligned state and rotatably by a flexible resin connector having interposing portions interposed among the respective rolling bodies and connecting portions for connecting the respective interposing portions; and wherein the resin connector is molded by an injection molding with the rolling bodies as cores by using a resin having a dimension change rate before and after an oil absorbing or a water absorbing treatment larger than a mold shrinkage rate and is provided with clearances between the resin connector and the rolling bodies formed by the oil absorbing or the water absorbing treatment.

* * * * *